United States Patent [19]

Sexton et al.

[11] 4,148,973

[45] Apr. 10, 1979

[54] HOMOGENEOUS, DUCTILE BRAZING FOILS

[75] Inventors: Peter Sexton, Randolph; Nicholas J. DeCristofaro, Madison, both of N.J.

[73] Assignee: Allied Chemical Corporation, Morris Township, N.J.

[21] Appl. No.: 912,667

[22] Filed: Jun. 5, 1978

Related U.S. Application Data

[63] Continuation of Ser. No. 751,000, Dec. 15, 1976, abandoned.

[51] Int. Cl.$^2$ .............................................. B32B 15/00
[52] U.S. Cl. ...................................... 428/680; 75/170; 75/171; 228/263; 428/606; 428/679
[58] Field of Search ............... 428/606, 680, 679, 926; 75/170, 171; 228/263

[56] References Cited

U.S. PATENT DOCUMENTS

| 3,856,513 | 12/1974 | Chen et al. | 75/171 |
| 3,871,836 | 3/1975 | Polk et al. | 75/170 |

OTHER PUBLICATIONS

"Splat Quenching of Iron-Nickel-Boron Alloys", Ruhl et al., Trans. Met. Soc. Aime, vol. 245, Feb. 1969, pp. 253-257.

Semi-Alloys Publication, Tech. Bull. No. BA-65, 1968.

*Primary Examiner*—Arthur J. Steiner
*Attorney, Agent, or Firm*—Ernest D. Buff

[57] ABSTRACT

Brazing of metal parts employing a homogeneous, ductile, filler metal foil is disclosed. The brazing foil, useful for brazing stainless steels, has a composition consisting essentially of 0 to about 4 atom percent iron, 0 to about 21 atom percent chromium, 0 to about 16 atom percent boron, 0 to about 19 atom percent silicon, 0 to about 22 atom percent phosphorus and the balance nickel and incidental impurities. In addition to containing the foregoing elements within the above-noted composition ranges, the composition must be such that the total of iron, chromium and nickel ranges from about 76 to 84 atom percent and the total of boron, silicon and phosphorus ranges from about 16 to 24 atom percent. The ductile foil permits fabrication of preforms of complex shapes which do not require binders and/or fluxes necessary for brazing powders presently used to braze stainless steels and nickel base alloys.

5 Claims, No Drawings

HOMOGENEOUS, DUCTILE BRAZING FOILS

This is a continuation, of application Ser. No. 751,000, filed Dec. 15, 1976, now abandoned.

BACKGROUND OF THE INVENTION

1. Field of the Invention

This invention relates to brazing of metal parts and, in particular, to a homogeneous, ductile brazing material useful in brazing stainless steels and high nickel alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, corrosion resistant, leak-tight joint is formed.

As a class, stainless steel alloys are more difficult to braze than are carbon and low-alloy steels. This is apparently due to the high chromium content associated with stainless steels. The formation of chromium oxide on the surfaces of stainless steels prevents wetting by the molten metal filler. Consequently, heating and brazing must be performed on carefully cleaned metal parts either in vacuum or under strongly reducing conditions, such as dry hydrogen or cracked ammonia. Alternatively, chemically active fluxes which dissolve the oxide must be used. However, extensive post-brazing cleaning is required to remove flux residues.

The brazing alloys suitable for use with stainless steels, designated AWS BNi compositions, contain a substantial amount (about 3 to 11 weight percent) of metalloid elements such as boron, silicon and/or phosphorus. Consequently, such alloys are very brittle and are available only as powder, powder-binder pastes, powder-binder tapes and bulky cast preforms. Powders are generally unsuitable for many brazing operations, such as dip brazing, and do not easily permit brazing of complex shapes. Although some powders are available as pastes employing organic binders, the binders form objectionable voids and residues during brazing.

Some brazing alloys are available in foil form. However, such materials are either fabricated only through a costly sequence of rolling and careful heat-treating steps or are prepared by powder metallurgical techniques. Rolled foil is not sufficiently ductile to permit stamping of complex shapes therefrom. Powder metallurgical foil is not homogeneous and employs binders, which form objectionable voids and residues during brazing.

Ductile glassy metal alloys have been disclosed in U.S. Pat. No. 3,856,513, issued Dec. 24, 1974 to H. S. Chen et al. These alloys include compositions having the formula $M_aY_bZ_c$, where M is a metal selected from the group consisting of iron, nickel, cobalt, vanadium and chromium, Y is an element selected from the group consisting of phosphorus, boron and carbon, and Z is an element selected from the group consisting of aluminum, silicon, tin, germanium, indium, antimony and beryllium, "a" ranges from about 60 to 90 atom percent, "b" ranges from about 10 to 30 atom percent and "c" ranges from about 0.1 to 15 atom percent. Also disclosed are glassy wires having the formula $T_iX_j$, where T is at least one transition metal and X is an element selected from the group consisting of phosphorus, boron, carbon, aluminum, silicon, tin, germanium, indium, beryllium and antimony, "i" ranges from about 70 to 87 atom percent and "j" ranges from about 13 to 30 atom percent. Such materials are conveniently prepared by rapid quenching from the melt using processing techniques that are now well-known in the art. No brazing compositions are disclosed therein, however.

There remains a need in the art for a homogeneous, brazing material that is available in ductile foil form.

SUMMARY OF THE INVENTION

In accordance with the invention, a homogeneous, ductile brazing material that is available in foil form is provided. The brazing foil has a composition consisting essentially of 0 to about 4 atom percent iron, 0 to about 21 atom percent chromium, 0 to about 16 atom percent boron, 0 to about 19 atom percent silicon, 0 to about 22 atom percent phosphorus and the balance essentially nickel and incidental impurities. In addition to containing the foregoing elements within the above-noted composition ranges, the composition must be such that the total of iron, chromium and nickel ranges from about 76 to 84 atom percent and the total of boron, silicon and phosphorus constitutes the remainder, that is, about 16 to 24 atom percent.

The homogeneous brazing foil of the invention is fabricated by a process which comprises forming a melt of the composition and quenching the melt on a rotating quench wheel at a rate of at least about $10^5$°C./sec.

Further in accordance with the invention, an improved process for joining two or more metal parts by brazing is disclosed. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly. The improvement comprises employing at least one homogeneous, ductile filler metal foil that has the composition given above.

The filler metal foil is easily fabricable as homogeneous, ductile ribbon, which is useful for brazing as cast. Advantageously, the metal foil can be stamped into complex shapes to provide braze preforms.

Further, the homogeneous, ductile brazing foil of the invention eliminates the need for binders and pastes that would otherwise form voids and contaminating residues. Also, the filler material provided by the invention enables alternative brazing processes of stainless steels, e.g., dip brazing in molten salts, to be employed.

DETAILED DESCRIPTION OF THE INVENTION

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metals being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention, a homogeneous, ductile brazing material in foil form is provided. The brazing foil has a composition consisting essentially of 0 to about 4 atom percent iron, 0 to about 21 atom percent chromium, 0 to about 16 atom percent boron, 0 to about 19 atom percent silicon, 0 to about 22 atom percent phosphorus and the balance essentially nickel and incidental impurities. The composition is such that the total of iron, chromium and nickel ranges from about 76 to 84 atom percent and the total of boron, silicon and phosphorus comprises the balance, that is, about 16 to 24 atom percent. These compositions are compatible with and more noble than stainless steels and are suitable for brazing austenitic, martensitic and ferritic stainless steels, as well as nickel base alloys.

By homogeneous is meant that the foil, as produced, is of substantially uniform composition in all dimensions. By ductile is meant that foil can be bent to a round radius as small as ten times the foil thickness without fracture.

Examples of brazing alloy compositions within the scope of the invention are set forth in Table I below.

TABLE I.

| | Composition, % | | | | | |
|---|---|---|---|---|---|---|
| | Fe | Ni | Cr | B | Si | P |
| Ni-P atom % | — | 81 | — | — | — | 19 |
| weight % | — | 89 | — | — | — | 11 |
| Ni-Cr-P atom % | — | 68.6 | 14.3 | — | — | 17.1 |
| weight % | — | 76 | 14 | — | — | 10 |
| Ni-Si-B(1) atom % | — | 80.9 | — | 9.0 | 10.1 | — |
| weight % | | 92.4 | — | 1.9 | 5.5 | — |
| Ni-Si-B(2) atom % | — | 78 | — | 14 | 8 | — |
| weight % | — | 92.4 | — | 3.1 | 4.5 | — |
| Ni-Cr-Fe-Si-B atom % | 2.7 | 68.8 | 6.6 | 14.0 | 7.9 | — |
| weight % | 3 | 82.4 | 7 | 3.1 | 4.5 | — |
| Ni-Cr-B atom % | — | 69.4 | 14.4 | 16.2 | — | — |
| weight % | — | 81.5 | 15 | 3.5 | — | — |

Within the broad range disclosed above are two preferred compositional ranges, which are sufficiently versatile to braze stainless steels and high nickel alloys under substantially all brazing conditions. One preferred composition consists essentially of 0 to about 4 atom percent iron, 0 to about 8 atom percent chromium, about 7 to 15 atom percent boron, about 5 to 10 atom percent silicon and the balance essentially nickel and incidental impurities. The total of iron, chromium and nickel ranges from about 78 to 84 atom percent and the total of boron and silicon ranges from about 16 to 22 atom percent. The boron-base alloys can withstand comparatively high service temperatures.

The second preferred composition consists essentially of 0 to about 16 atom percent chromium, about 16 to 22 atom percent phosphorus and the balance essentially nickel and incidental impurities. The total of chromium and nickel ranges from about 78 to 84 atom percent. The phosphorus-base alloys, being boron-free, are suitable for use in nuclear reactors. In addition, less stringent brazing conditions, such as cracked ammonia, may be employed during brazing.

Further in accordance with the invention, an improved process for joining two or more metal parts is disclosed. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly. The improvement comprises employing at least one homogeneous, ductile filler metal foil having a composition within the ranges given above.

The brazing temperature of the brazing alloys of the invention ranges from about 925° to 1205° C. (1700° to 2200° F.). The temperature of brazing is thus above the sensitizing temperature range of the 300 series stainless steels. This is in contrast to the brazing temperatures of silver brazing alloys, which fall within the sensitizing temperature range. As is well-known, when 18-8 stainless steels are heated at about 510° to 790° C. (950° to 1450° F.) for any appreciable length of time, they become sensitized or susceptible to intergranular corrosion. This is apparently due to the depletion of chromium in the grain-boundary areas. Sensitizing is thus avoided by use of the brazing foils of the invention.

The brazing foils of the invention are prepared by cooling a melt of the desired composition at a rate of at least about $10^{5°}$ C./sec, employing metal alloy quenching techniques well-known to the glassy metal alloy art; see, e.g., U.S. Pat. No. 3,856,513, discussed earlier. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys. Preferably, the glassy metal alloys must be at least 80% glassy, and most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 0.0015 to 0.0025 inch thick, which is also the desired spacing between bodies being brazed. Such spacing maximizes the strength of the braze joint. Thinner foils stacked to form a thickness of about 0.0015 to 0.0025 inch may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal postbrazing treatment.

In general, the strength of the resulting brazed joints is generally at least equal to that of brazed joints prepared from conventional powder brazes of the same composition. With alloys based on the Ni—B—Si system, braze joints made with ductile brazing ribbons of the invention are consistently stronger than joints made with paste. With alloys based on the Ni-P system, brazed joints made with ribbon and paste exhibit approximately the same shear strength. Without subscribing to any particular theory, it appears that the lower surface area of the ribbon, which would be less susceptible to oxidation than powder, and the greater area of contact between base metal and ribbon as compared with base metal and powder contribute significantly to joint strength.

The brazing foils of the invention are also superior to various powder brazes of the same composition in providing good braze joints. This is probably due to the ability to apply the brazing foil where the braze is required, rather than depending on capillarity to transport braze filler from the edge of surfaces to be brazed.

EXAMPLES

EXAMPLE 1

Ribbons about 2.5 to 6.5 mm (about 0.10 to 0.25 inch) wide and about 40 to 60 μm (about 0.0015 to 0.0025 inch) thick were formed by squirting a melt of the particular composition by overpressure of argon onto a rapidly rotating copper chill wheel (surface speed about 3000 to 6000 ft/min). Metastable, homogeneous ribbons of substantially glassy alloys having the following compositions in weight percent and atom percent were produced:

| Sample No. | | Fe | Ni | Cr | B | Si | P |
|---|---|---|---|---|---|---|---|
| 1 | (wt %) | 3.0 | 82.4 | 7 | 3.1 | 4.5 | — |
|   | (at %) | 2.7 | 68.8 | 6.6 | 14.0 | 7.9 | — |
| 2 | (wt %) | — | 89 | — | — | — | 11 |
|   | (at %) | — | 81 | — | — | — | 19 |
| 3 | (wt %) | — | 76 | 14 | — | — | 10 |
|   | (at %) | — | 68.6 | 14.3 | — | — | 17.1 |
| 4 | (wt %) | — | 92.4 | — | 1.9 | 5.5 | — |
|   | (at %) | — | 80.9 | — | 9.0 | 10.1 | — |
| 5 | (wt %) | — | 81.5 | 15 | 3.5 | — | — |
|   | (at %) | — | 69.4 | 14.4 | 16.2 | — | — |
| 6 | (wt %) | — | 92.4 | — | 3.1 | 4.5 | — |
|   | (at %) | — | 78 | — | 14 | 8 | — |

EXAMPLE 2

Tensile test specimens were cut from AISI types 430SS and 304SS in strip form. The thicknesses were both 0.036 inch. A brazing alloy of the invention, a glassy, ductile ribbon of nominal composition of Sample No. 2 within specification AWS A5.8-76 for BNi6 and having dimensions 0.0017 inch thick by 0.175 inch wide, was used to braze some of the test specimens. For comparison, a brazing paste of the same composition and specification, sold under the trade designation Nicrobraz ® 10 (available commercially from Wall-Colmonoy Co. of Detroit, Michigan), was used to braze other test specimens.

The tensile specimens were dimensioned and fabricated per ASTM D638 and were of the type I variety. The tensile specimens were cut perpendicularly to the length direction at the mid-point of the length. Braze joints were of the lap type, with the lap dimension carefully controlled to ⅜ inch or ¼ inch (for type 430 stainless steel) or ⅜ inch or ¼ inch (for type 304 stainless steel). Uncut tensile specimens were kept as controls to determine tensile properties after the brazing cycle. Brazing specimens were degreased with warm benzene. Lap joints containing brazing ribbons of the invention were assembled with either one ribbon or four ribbons side-by-side the length of the lap joint. In the case of these brazing alloys, the ribbons acted as the spacers. A single spot weld was used to hold the assembly together, as is common industrial practice.

Identical lap joints were prepared for use with the brazing paste. A spacer of 0.0015 inch type 410 stainless steel approximately 0.19 inch by 0.15 inch was used, as is conventional when employing brazing pastes. A single spot weld was made, employing identical welding parameters as above. Braze specimens utilizing the brazing paste had the paste applied in the prescribed manner as practiced commercially.

Brazing was done in a belt furnace with a dry, cracked ammonia atmosphere. The furnace was operated at 1900° F. at 1 ft/min. The length of the hot zone was 8 ft.

Upon brazing, all shear specimens and stainless steel controls were subjected to tensile shear testing, with the following results:

| | | Joint Shear Strength, psi | |
|---|---|---|---|
| Metal | Braze Filler | Range | Avg. |
| 304SS | brazing paste | 3,733–4,933 | 4,208 |
| 304SS | 1 ribbon | 2,747–5,627 | 4,165 |
| 304SS | 4 ribbons | 3,000–4,320 | 3,380 |
| 430SS | brazing paste | >4,267–6,160 | >5,698 |
| 430SS | 1 ribbon | >5,493–>5,893 | >5,693 |
| 430SS | 4 ribbons | >6,880 | >6,880 |

The ultimate tensile strength of controls after brazing cycle was as follows:

| AISI | 304 | 93,300 | psi |
|---|---|---|---|
| AISI | 430 | 102,800 | psi |

The brazes on 430SS were observed to be stonger in general than on 304SS. As is well-known, thin brazes are subjected to triaxial stress conditions, and the resultant stress at failure is a function of the ultimate tensile stress of both the braze filler metal and the base metal. Since 430 stainless steel has a higher ultimate tensile strength than 304 stainless steel, brazed joints of 430 stainless steel appear to be stronger than brazed joints of 304 stainless steel.

All 430SS brazes were observed to fail in the base metal and not in the braze; therefore, the values reported are lower bounds.

EXAMPLE 3

Tensile test specimens of AISI 430SS and 304SS were prepared for brazing as in Example 2. A brazing alloy of the invention, a glassy ductile ribbon of nominal composition of Sample No. 3 within specification AWS A5.8-76 for BNi7 and having dimensions 0.0021 inch thick by 0.106 inch wide was used to braze six test specimens.

Two ribbons side-by-side placed the length of the lap joint were used. For comparison, a brazing paste of the same composition and specification, sold under the trade designation Nicrobraz ® 50 was used to braze six test specimens.

Brazing was done in a belt furnace with a dry, cracked ammonia atmosphere. The furnace was operated at 1950° F. at 0.4 ft/min. The length of the hot zone was 8 ft.

The brazed joints evidenced the following joint shear strengths:

| Metal | Braze Filler | Joint Shear Strength, psi Range | Avg. |
|---|---|---|---|
| 304SS | brazing paste | 3,620–4,600 | 4,050 |
| 304SS | 2 ribbons | 3,320–4,220 | 3,790 |

In all the 430SS specimens, the base metal failed before the braze.

Of the six specimens brazed with brazing foil of the invention, good brazes were obtained in all cases. Of the six specimens brazed with brazing paste, good brazes were obtained in all cases.

EXAMPLE 4

Tensile test specimens of AISI 430SS and 304SS were prepared for brazing as in Example 2. A brazing alloy of the invention, a glassy ductile ribbon of nominal composition of Sample No. 6 within specification AWS A5.8-76 for BNi3 and having dimensions 0.0021 inch thick by 0.108 inch wide was used to braze six test specimens. Two ribbons side-by-side placed the length of the lap joint were used. For comparison, a brazing paste of the same composition and specification, sold under the trade designation Nicrobraz ® 130, was used to braze six test specimens.

Brazing was done in a vacuum furnace which was evacuated to 0.1 μm then back-filled with N₂ to a partial pressure of 100 μm. The furnace was held at 1900° F. for 15 min.

The brazed joints evidenced the following joint shear strengths:

| Metal | Braze Filler | Joint Shear Strength, psi Range | Avg. |
|---|---|---|---|
| 304SS | brazing paste | 5,950–11,360 | 7,645 |
| 304SS | 2 ribbons | 7,900–10,510 | 9,050 |

In all the 430SS specimens, the base metal failed before the braze.

Of the six specimens brazed with brazing foil of the invention, good brazes were obtained in all cases. Of the six specimens brazed with brazing paste, good brazes were obtained in only four cases.

EXAMPLE 5

Tensile text specimens of AISI 430SS and 304SS were prepared for brazing as in Example 2, A brazing alloy of the invention, a glassy ductile ribbon of nominal composition of Sample No. 1 within specification AWS A5.8-76 for BNi2 and having dimensions 0.0016 inch thick by 0.205 inch wide was used to braze six test specimens. One ribbon placed the length of the lap joint was used. For comparison, a brazing paste of the same composition and specification, sold under the trade designation Nicrobraz ® LM, was used to braze six test specimens.

Brazing was done in a vacuum furnace as in Example 4.

The brazed joints evidenced the following joint shear strengths.

| Metal | Braze Filler | Joint Shear Strength, psi Range | Avg. |
|---|---|---|---|
| 304SS | brazing paste | 5,310–8,630 | 6,940 |
| 304SS | 1 ribbon | 8,910–11,380 | 9,680 |

In all the 430SS specimens, the base metal failed before the braze.

Of the six specimens brazed with brazing foil of the invention, good brazes were obtained in all cases. Of the six specimens brazed with brazing paste, good brazes were obtained in only three cases.

What is claimed is:

1. A brazed metal article, said article having been brazed with a filler metal in the form of a homogeneous, ductile brazing foil composed of metastable material having at least 50 percent glassy structure, said foil having a composition selected from the group consisting of:
   (a) 0 to about 3.5 atom percent iron, 0 to about 8 atom percent chromium, about 7 to 15 atom percent boron, about 5 to 10 atom percent silicon, and the balance essentially nickel and incidental impurities, wherein the composition is such that the total of iron, nickel and chromium ranges from about 78 to 84 atom percent and the total of boron and silicon ranges from about 16 to 22 atom percent and
   (b) 0 to about 16 atom percent chromium, about 16 to 22 atom percent phosphorus and the balance essentially nickel and incidental impurities, wherein the composition is such that the total of nickel and chromium ranges from about 78 to 84 atom percent.

2. The brazed metal article of claim 1 wherein said foil is at least about 50% glassy.

3. The brazed metal article of claim 1 wherein said foil is at least about 80% glassy.

4. The brazed metal article of claim 1 wherein said foil is substantially glassy.

5. The brazed metal article of claim 1 wherein said foil has a thickness ranging from about 0.0015 to 0.0025 inch.

* * * * *